(12) United States Patent
Boicey (10) Patent No.: US 10,474,118 B2
(45) Date of Patent: Nov. 12, 2019

(54) HEAT ENERGY MANAGEMENT SYSTEM

(71) Applicant: Trevor Boicey, Ottawa (CA)

(72) Inventor: Trevor Boicey, Ottawa (CA)

(*) Notice: Subject to any disclaimer, the term of this patent is extended or adjusted under 35 U.S.C. 154(b) by 197 days.

(21) Appl. No.: 15/168,328

(22) Filed: May 31, 2016

(65) Prior Publication Data

US 2017/0123393 A1     May 4, 2017

Related U.S. Application Data

(60) Provisional application No. 62/247,859, filed on Oct. 29, 2015.

(51) Int. Cl.
*G05B 19/042* (2006.01)
*H04L 12/58* (2006.01)
*H04L 29/08* (2006.01)
*H04W 84/18* (2009.01)

(52) U.S. Cl.
CPC ............ *G05B 19/042* (2013.01); *H04L 51/22* (2013.01); *H04L 51/24* (2013.01); *H04L 51/36* (2013.01); *H04L 51/38* (2013.01); *H04L 67/02* (2013.01); *H04L 67/10* (2013.01); *H04W 84/18* (2013.01); *G05B 2219/2639* (2013.01)

(58) Field of Classification Search
CPC ......... H04L 51/22; H04L 51/24; H04L 51/36; H04L 51/38; H04L 67/02; H04L 67/10; G05B 13/042
USPC ........................................................ 700/295
See application file for complete search history.

(56) References Cited

U.S. PATENT DOCUMENTS

| | | | |
|---|---|---|---|
| 6,098,893 A * | 8/2000 | Berglund | G05D 23/1917 236/51 |
| 6,405,103 B1 * | 6/2002 | Ryan | G05B 15/02 700/275 |
| 6,598,195 B1 * | 7/2003 | Adibhatla | G05B 23/0275 361/88 |
| 7,216,017 B2 * | 5/2007 | Kwon | G05B 19/042 379/102.05 |
| 7,719,440 B2 | 5/2010 | Delp | |
| 8,224,490 B2 | 7/2012 | Knyazev | |
| 8,326,465 B2 | 12/2012 | Rosca et al. | |
| 8,610,590 B2 | 12/2013 | Radovilsky et al. | |
| 8,682,937 B2 | 3/2014 | Ludwig | |
| 8,866,343 B2 | 10/2014 | Abraham et al. | |

(Continued)

FOREIGN PATENT DOCUMENTS

KR    10-2014-0120408 A    10/2014

*Primary Examiner* — Darrin D Dunn
*Assistant Examiner* — Christopher W Carter
(74) *Attorney, Agent, or Firm* — Brion Raffoul (57) ABSTRACT

Methods and systems relating to the monitoring and control of heating devices in multiple units in one or more buildings. An intelligent node, containing a monitoring module and a controlling module, is installed for each unit in a building. The monitoring module monitors the activation and deactivation of the heating device or, alternatively, directly measures the amount of power used by the heating device. This monitoring data is transmitted to a central server and is sent to a user. The user can control the duty cycle of the heating device and, as such, can directly cause savings in energy. The duty cycle for each heating device is adjusted by the controlling module based on the user's commands. The system can also be used so that the duty cycle is set such that energy settings for adjacent units are similar.

18 Claims, 7 Drawing Sheets

(56) References Cited

U.S. PATENT DOCUMENTS

| | | | |
|---|---|---|---|
| 8,965,586 B2 | 2/2015 | Miller et al. | |
| 9,080,782 B1 | 7/2015 | Sheikh | |
| 2005/0097902 A1* | 5/2005 | Kwon | F24F 11/30 |
| | | | 62/126 |
| 2007/0267508 A1 | 11/2007 | Hoglund et al. | |
| 2010/0211224 A1 | 8/2010 | Keeling et al. | |
| 2013/0096726 A1* | 4/2013 | Lyren | H02J 3/14 |
| | | | 700/291 |
| 2013/0289967 A1 | 10/2013 | Ludwig | |
| 2014/0129040 A1* | 5/2014 | Emadi | G06Q 50/06 |
| | | | 700/291 |
| 2014/0156088 A1 | 6/2014 | Li et al. | |

* cited by examiner

HEAT ENERGY MANAGEMENT SYSTEM

RELATED APPLICATIONS

This application is a non-provisional patent application which claims the benefit of U.S. Provisional Patent Application No. 62/247,859 filed Oct. 29, 2015.

TECHNICAL FIELD

The present invention relates to the field of energy management. More specifically, this invention relates to methods, systems, and devices that allow a user to manage the energy consumption of one or more devices at multiple locations.

BACKGROUND

Energy management is an important consideration in commercial buildings, including apartment buildings and condominiums. Energy is often wasted in large amounts due to poor temperature control. For example, in cold climates, heating a space may use unnecessary amounts of energy due to a window being open, poor insulation, or poor air circulation. Such energy expenditures are difficult for building managers to monitor and to control without compromising the tenant's comfort.

It is also difficult for building managers to monitor or control per-unit heat energy consumption. As such, when energy is wasted, a building manager may not be specifically aware of the source of the problem. While existing technologies allow for the building manager to monitor overall energy consumption and/or unit temperature, the manager must confront the tenant to make adjustments to their energy consumption habits.

U.S. Pat. No. 8,224,490 describes a system that limits the amount of energy available for a given unit by way of predetermined algorithms. However, such methods and systems do not include real time monitoring and analysis. As such, personalized temperature control for a given position of a unit in a building as well as any insulation leaks or open windows cannot be compensated for, monitored, or controlled.

Additionally, with existing technologies, changes to the system may only be made on site using specialized tools and requiring expertise with complex technologies.

U.S. Pat. No. 8,965,586 is a method and apparatus for retrofitting constant volume HVAC devices by taking control of existing air movement.

There is therefore a need to mitigate, if not overcome, the shortcomings of the prior art and to provide a method and system for reducing energy consumption in temperature control by controlling and monitoring energy output toward temperature control.

SUMMARY

The present invention provides methods and systems relating to the monitoring and control of heating devices in multiple units in one or more buildings. An intelligent node, containing a monitoring module and a controlling module, is installed for each unit in a building. The monitoring module monitors the activation and deactivation of the heating device or, alternatively, directly measures the amount of power used by the heating device. This monitoring data is transmitted to a central server and is made available to a user. The user can control the duty cycle of the heating device and, as such, can directly cause savings in energy. The duty cycle for each heating device is adjusted by the controlling module based on the user's commands.

In a first aspect, the present invention provides a system for managing energy consumption in multiple locations, the system comprising:
  a plurality of controller modules, each controller module being for controlling how much energy is used by a specific device at a specific location;
  a plurality of monitoring modules, each monitoring module being for monitoring and reporting on said specific device over a specific period of time;
  a main controller device, said main controller device being for receiving reports from said plurality of monitoring modules and for controlling each of said plurality of controller modules, said main controller device also being for aggregating reports from said monitoring modules, sending said reports to a central data storage, and for receiving control commands relating to said controller modules from a user; wherein
  each controller module is independently controlled by said main controller device.

BRIEF DESCRIPTION OF THE DRAWINGS

The embodiments of the present invention will now be described by reference to the following figures, in which identical reference numerals in different figures indicate identical elements and in which.

The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention.

DETAILED DESCRIPTION

The terms "coupled" and "connected", along with their derivatives, may be used herein. It should be understood that these terms are not intended as synonyms for each other. Rather, in particular embodiments, "connected" may be used to indicate that two or more elements are in direct physical or electrical contact with each other. "Coupled" may be used to indicated that two or more elements are in either direct or indirect (with other intervening elements between them) physical or electrical contact with each other, or that the two or more elements cooperate or interact with each other (e.g. as in a cause and effect relationship).

The present invention includes a system and method for reducing energy consumption through controlling a heating device's duty cycle. Specifically, the energy usage of multiple heating devices within a single or a group of buildings is monitored and controlled by a user. The heating devices may be located in the building's multiple units or they may be located in the building's common areas (especially for residential buildings). The energy usage for each heating device is monitored by way of a monitoring module that determines when each heating device is active or inactive. Optionally, the monitoring module may also measure how much energy is consumed by that specific heating device. The monitoring module reports each heating device's energy consumption or active/inactive cycles to a central server. The central server, if necessary, sends commands to multiple controller modules that control or limit each heating device's duty cycle. Each controller module and each monitoring module pair is, of course, associated with a specific heating device. This allows for both controlling and monitoring functions to be implemented on a per heating device manner. Each heating device can then be monitored and controlled separately and independently of other heating devices in the building.

In one implementation, each controller module controls a heating device's duty cycle based on commands from the central server. The central server sends a throttle factor command that limits, as a percentage, the amount of time that the heating device is active. Thus, if the throttle factor for a specific heating device is set to 75%, then this means that, for a given period of time, the maximum that the heating device can be active is 75% of the time. The device is, therefore, inactive 25% of the time. It should be noted that the thermostat in the unit still controls the heating device but the controller module controls how often the heating device is active or inactive.

In one implementation, the throttle factor is implemented as a function of time on a per second or per minute basis. In one implementation, the time window used to determine activity and inactivity for the heating device is anywhere from 10-60 seconds. Thus, if the time window is 10 seconds with a throttle factor of 70%, then the heating device is active for 7 seconds and inactive for 3 seconds for every 10 second time window. Similarly, if the time window is 30 seconds and the throttle factor is set to 75%, then the heating device is active for 23 seconds and inactive for 7 seconds. It should be noted that, for fractional percentages of time in the time window, the period may be rounded up or down depending on the configuration. Thus, a 75% throttle factor for a 30 second time window should mean that the heating device is active for 22.5 seconds and inactive for 7.5 seconds. However, instead of dealing with fractional periods of time, the 22.5 seconds of active time can be rounded up to 23 seconds and the 7.5 seconds of inactive time can be rounded down to 7 seconds.

It should be noted that it is preferable that the time window be small enough such that, regardless of the throttle factor, the heating device has enough residual heat to feel warm to the touch even if it is in its inactive cycle. As can be imagined, if the time window is in the order of 30 seconds, even a throttle factor of 50% is used, this means that the heating device is on for 15 seconds and off for 15 seconds. For that time window and throttle factor, the heating device does not have a chance to cool down. If, on the other hand, the time window was set to 30 minutes, then a throttle factor of 50% means that the heating device is inactive for 15 minutes. Clearly, the heating device will cool down during the inactive period and give the tenant the impression that the heating device is off or is malfunctioning. Preferably, this impression is best avoided.

In one embodiment, the system includes hardware for retrofitting a building's electrical panel. The various controller and monitoring modules can be coupled to each building unit's electrical circuitry through the main electrical panel such that the circuit for each unit's heating device is coupled and controlled by the controller and monitoring modules. Alternatively, the controller and monitoring modules can be installed within each unit.

In one embodiment of the present invention, the system determines the desired or actual energy output to each location or unit based on a variety of factors, including, but not limited to:
  external temperature;
  external wind speed (as determined by an on-site anemometer or as retrieved from an on-line source);
  location of the unit, for example, the north-facing side may be cooler than the south-facing side so the settings for heating devices would be different for the north-facing versus the south-facing units;
  special tenant or location based needs or deficiencies, including but not limited to: air leaks in the unit, ground floor location of the unit, large external facing doors in the unit (e.g. large patio doors, especially for ground floor units), tenant requirements for higher than normal heating (e.g. for a health condition the tenant may have);
  the energy consumption of surrounding units (in one implementation, a block of units can be configured to have the same or similar settings for energy output or consumption such that if unit A is using X kW, surrounding units are configured to throttle consumption to kW values near or similar to X);
  maintenance condition of the unit, for example, if some unit windows are leaking heat and in need of repair; etc.

In another embodiment, the monitoring and control of the energy usage of building units or locations may be performed on-site or remotely through a wired or wireless network. By remotely controlling the amount of time heating devices are active, the burden to properly provide a comfortable temperature may shift to a tenant living in the unit or to the superintendent of the building. As an example, a heating device in a unit in the building may be activating more than normal due to an open window in the unit. In such a situation, the heating device would be trying to heat the unit to the desired temperature as set on the unit's thermostat. However, because of the open window, the unit does not reach, or has trouble reaching, the desired temperature because whatever heat is provided by the heating device is counteracted by the cool air from the open window. Since the heating unit's duty cycle is limited by the controller module to a value less than 100 (i.e. the heating unit cannot be active 100% of the time), if the tenant wants the unit heated to the desired temperature, he or she will need to close the window.

In another example, in the event that a unit's heating device has not been active for an extended period of time, an alert is sent to the user or to the building's superintendent. To prevent potential freezing damage or to determine why the heating device has not been activated, the superintendent will need to physically intervene to check the unit, the modules, or the heating device.

Figure 1:
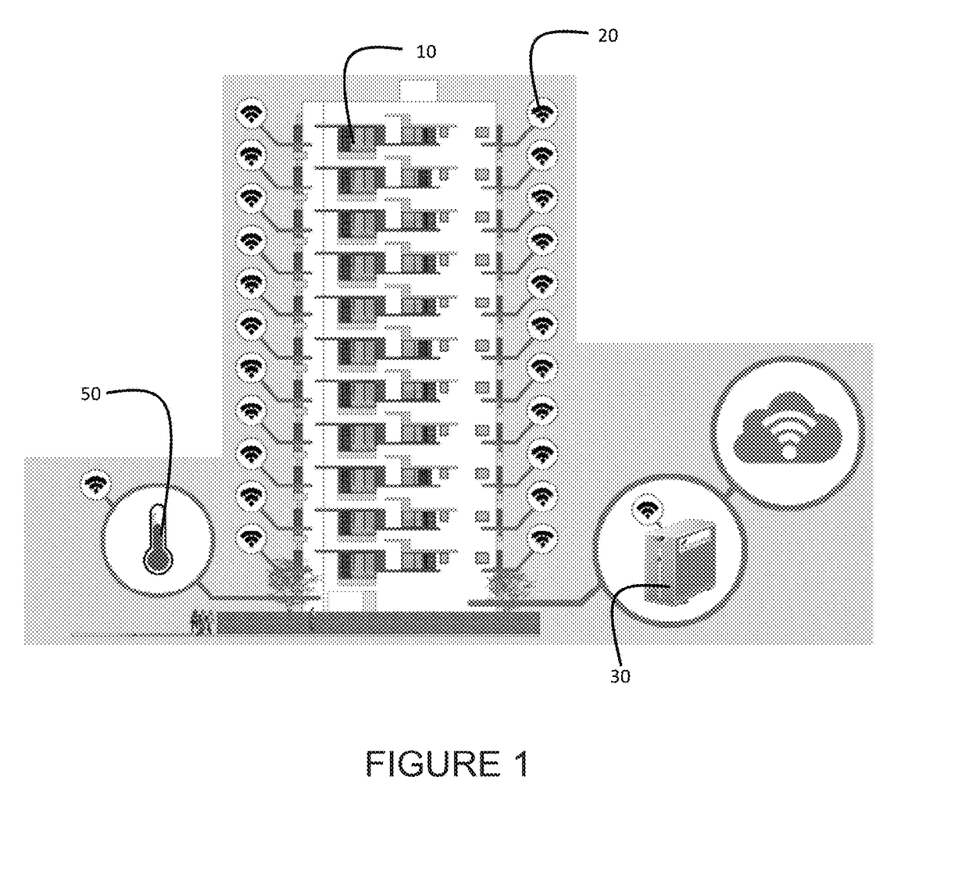
FIG. 1 shows a system block diagram of elements in one embodiment of the present invention.

Referring to FIG. 1, a system block diagram of elements in one embodiment of the present invention, building units 10 are connected to at least one intelligent node 20. The nodes 20 are connected to a central server 30 via a network (not shown). In one embodiment, the network may be a self-healing wireless mesh network. In another embodiment, a user interface may be associated with the system for viewing data and controlling energy output.

It should be noted that the intelligent node 20 includes the controller module and the monitoring module. In one configuration, the monitoring module merely records when the heating device is active and when it is inactive. In another configuration, the monitoring module actively measures how much energy is used (in kilowatts) by the heating device when active. For all configurations, the controller module is coupled to the power connections for the heating device and can activate/deactivate the heating device based on the duty cycle settings set by the central server.

For the configuration where the monitoring module measures the energy used by the heating device, the system may include a retrofitted relay panel in the electrical panel of a unit 10 or of the building. The relay can form part of the monitoring module and may be placed between the main power circuit and the heating device. The current may be measured to determine the energy consumed. The measurement of this current is continuous and energy usage reports can be generated by the system and shown on the user interface.

Depending on the configuration of the system, each intelligent node 20 may be located in a unit in the building or the intelligent nodes 20 may be placed in the centralized energy panel for the whole building. For the first option, each intelligent unit 20 would be unobtrusively installed inside one of the building units and would be coupled to the relevant heating device. Preferably, the intelligent node 20 would be located behind a nondescript panel so as not to attract a tenant's attention.

In one embodiment, the system includes a temperature sensor or thermometer 50 to monitor the external temperature of the building. The thermometer 50 may be wirelessly connected to the network such that the thermometer is accessible to the central server. Preferably, the thermometer 50 is weatherproof so that it may withstand harsh external temperatures and severe weather conditions. The external temperature can be used to assist in determining the amount of energy that should be made available to each heating device by the system. The external temperature information can be made accessible for viewing by a building manager by way of the network on a user interface.

Similarly, instead of an external thermometer or any similar device, the central server may be equipped to access current external conditions by way of the Internet. As an example, the central server may access an Internet-based data feed that provides real-time temperature data for the building's location. This temperature data can then be used by the central server to determine the duty cycle settings for the controller modules. As an example, if the external temperatures are in the mid to high 20s (in Celsius), all the controller modules may be configured to provide a 10 to 20% duty cycle. As such, regardless of what temperature setting a tenant may set his or her thermostat, each heating device is only active for a maximum of 10 to 20% of the time. Similarly, if the external temperature is in the −20 degrees Celsius range, the central server may set each controller module to a duty cycle setting of 75 to 80%. In this example, a heating device may, therefore, be active for a maximum of 80% of the time.

In another configuration, a thermometer-equipped installation can use online-gathered data as a check against issues with the system. The thermometer reading can be checked against online sources of current temperatures. Discrepancies, especially large discrepancies between the two, can indicate issues with the system and may be used to trigger the system into fail-safe mode. As an example, if the online sources indicate a temperature of −25 C while the thermometer indicates 10 C, having the system declare a system-wide throttle factor of 10% could be dangerous to both life and property. In such a case, the system can, instead, declare a fault and enter fail-safe mode.

It should be noted that while the above discusses monitoring energy consumption due to a heating device, the concept of the invention can be extended to the monitoring of other utilities. As an example, instead of electrical energy, monitoring and controlling modules can be used to monitor and control the usage of water or electricity use due to specific appliances.

In one implementation, the central server receives reports from the various monitoring modules by way of a data network. The data network may be wired using wired network connections throughout the building. However, a wireless connection between the central server and the various monitoring modules is preferable. Such a wireless network allows for quick addition or removal of monitoring modules from the network. As well, a wireless network avoids the hassle and inconvenience of wiring the building for a wired network. Of course, for such a wireless network, it is preferable that the communications between the central server and the various nodes and modules be encrypted and secured using suitable security devices, encryption, and protocols.

As noted above, the central server aggregates the various reports received from the monitoring modules. Since the monitoring modules continuously report the status of the heating device being monitored, the aggregated reports from the central server provide a near real-time indication of the status of the various heating devices in the building. The aggregated reports are then uploaded from the central server to a network accessible data storage site where the reports can be retrieved. In one configuration, the central server bundles the various reports and then uploads these bundles at specific time intervals. Alternatively, the central server can upload reports to the data storage as these reports are received from the monitoring modules. The data storage site is, as noted previously, a network accessible site, preferably a network cloud based storage solution. Such a cloud-based data storage site allows for authorized devices to access the data reports by way of an Internet connection. A user with the proper data credentials and the proper application can retrieve the continuously updated data and determine the status of the various heating devices in the building.

As noted above, the central server sends commands to each of the controller modules within the building. Such commands include duty cycle settings. The commands may be sent from the central server to a monitoring module and, from the monitoring module, be passed on to the associated controlling module. Alternatively, the commands may be sent directly from the central server to each controlling module. Depending on the system configuration, the data flow between the monitoring modules and the central server may be one-way with reporting data being sent from the monitoring modules to the central server. Similarly, the data flow from the central server to each controlling module would be one way as well with commands from the central server being sent to the controlling module. Alternatively, data may flow in a two-way manner between the central server and the monitoring module. The monitoring module would send reporting data to the central server and, when necessary, the central server would send commands to the controlling module by way of the monitoring module.

In another implementation, the aggregated data reports from the various heating devices in the various building units are retrieved from the network cloud based storage site using an application that presents the data to a user in a specific, user-friendly manner. FIGS. 2-7 illustrate different user interfaces for presenting such data to the user.

It should be noted that the user interfaces in FIGS. 2-7 may be implemented on any suitable data processing device. A personal computer, a mobile phone, a smartphone, or a tablet device may be used. In one implementation, the user device would login to the data storage site, download the relevant data, and present such data to the user. The formatting of the data in the reports, the presentation of the data, and any data processing would, preferably, be performed by the user device.

Figure 2:
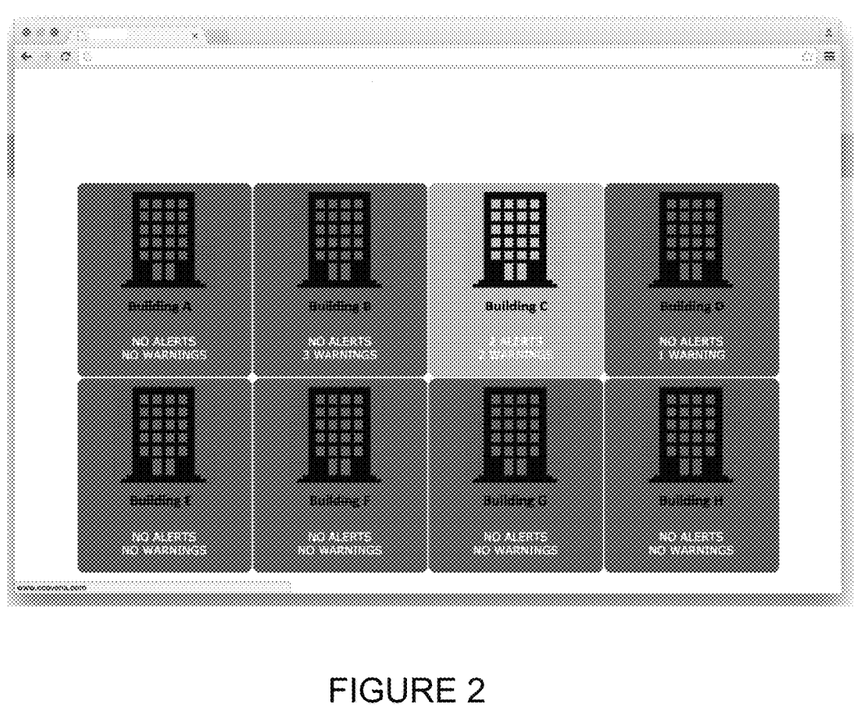
FIG. 2 is a wireframe of a user interface according to another embodiment of the present invention.

Referring to FIG. 2, a screen shot of one implementation of a user interface for reporting data to a user is illustrated. In FIG. 2, the user is receiving data from multiple buildings. In this example, data from eight buildings are presented with real-time updated data from each building being shown. One building has two alerts and two warnings. The alerts may be related to units whose heating devices have not been turned on for an extended period of time or to units whose heating devices have been unusually active for an extended period of time. Similarly, the warnings may be related to heating devices which have not been active or which have been too active. However, the activity or inactivity of these heating units would not be to a degree that would warrant a visit from the building's superintendent. Of course, the level of activity or inactivity of a heating device that would warrant a warning or an alert is user configurable. Such levels may also be adjustable based on the time of year. As an example, if a heating device has been inactive for five days, this may not warrant a warning or an alert during the summer months. Similarly, a heating device that is active for five straight days would probably not warrant a warning or an alert during the middle of winter. However, the two day inactivity of a heating device during the winter months may warrant at least a warning and, most probably, a high level alert. Similarly, two days of continuous activity for a heating device in the middle of summer should also be a cause for a warning if not an alert.

From FIG. 2, it should be clear that the user can be a building manager who manages multiple properties including multiple buildings. By using the system and the various user interfaces of the invention, the user can continuously manage and monitor the various properties under his or her care.

Figure 3:
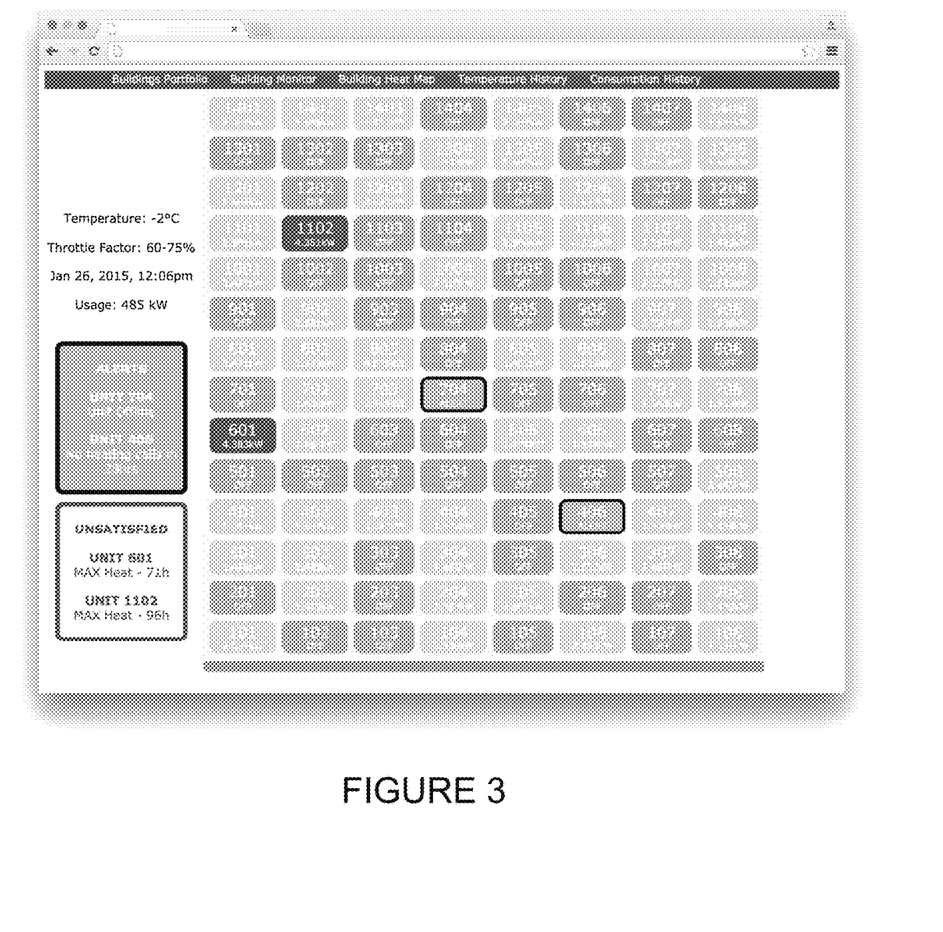
FIG. 3 is a wireframe of a dashboard according to yet another embodiment of the present invention.

Should the user wish to delve deeper into the property with the two alerts and two warnings, the screen shot in FIG. 3 can be used. As can be seen from FIG. 3, a screen shot detailing the status of each of multiple heating devices in multiple units in a single building is presented. In this screen shot, each unit in the building is represented and the status of each unit's heating device is detailed. Each heating device is off or active. If a heating device is active, the amount of power used is detailed. Heating devices which are overactive (i.e. which are consuming more than a normal amount of energy) are detailed with a red background for their units. As an example, it can be seen that Unit 601 has had its heating device active continuously for 71 hours and has consumed 4.303 kW of power. Similarly, Unit 1102 has had its heating device continuously active for 96 hours and has consumed 4.351 kW of power. Both these situations may require intervention by a building superintendent or by a tenant. The duty cycle for these units may need to be reduced or a visit to determine the situation may be required. Heating devices which are the subject of an alert are color-coded with a yellow background and some details about the alert are provided. As an example, Unit 704's heating device is offline, meaning the monitoring module for that heating device is not connected to the central server. For Unit 406, its heating device has not been active for 28 hours. Both these situations may require a direct intervention by a building superintendent as the monitoring module for the two units may be malfunctioning. In another embodiment of the present invention, the color-coded alerts may utilize different colors and details.

Figure 4:
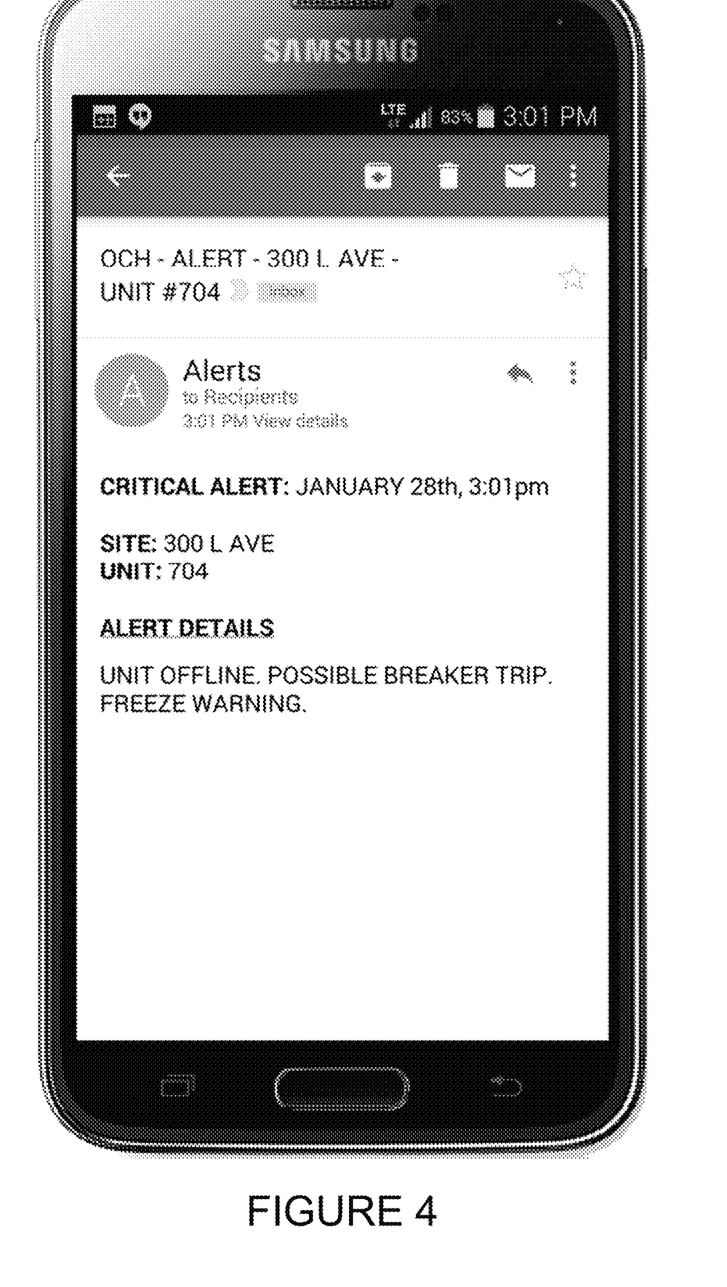
FIG. 4 shows an alert notification according to one embodiment of the present invention.

Referring to FIG. 4, the alerts or warnings regarding one or more units can be presented to the user by way of the user's smartphone. FIG. 4 shows a screenshot of a smartphone with an alert for the user. As can be seen, the alert provides the user with the type of alert (i.e. a critical alert), the location/building for the alert (i.e. 300 L Ave.), the unit for the alert (i.e. unit 704), along with details regarding the alert. Of course, the date and time the alert occurred is also provided to the user. The important details for the alert can be extracted from the data report from the data storage (i.e. the heating device at unit 704 is offline) while the potential cause can be provided by the device using a database that correlates alerts and potential causes for the alerts.

It should be noted that the alert provided to the user in FIG. 4 takes the form of an email. In the event an alert is issued by the central server, a suitable alert email is sent to the user detailing the relevant information regarding the alert. Other relevant people, such as the building superintendent, may also be copied on the alert emails. It should be clear that while the implementation in FIG. 4 uses an alert email, other implementations may use text messaging (e.g. using the SMS or MMS system), online messaging, or any other messaging/communication channels.

Figure 5:
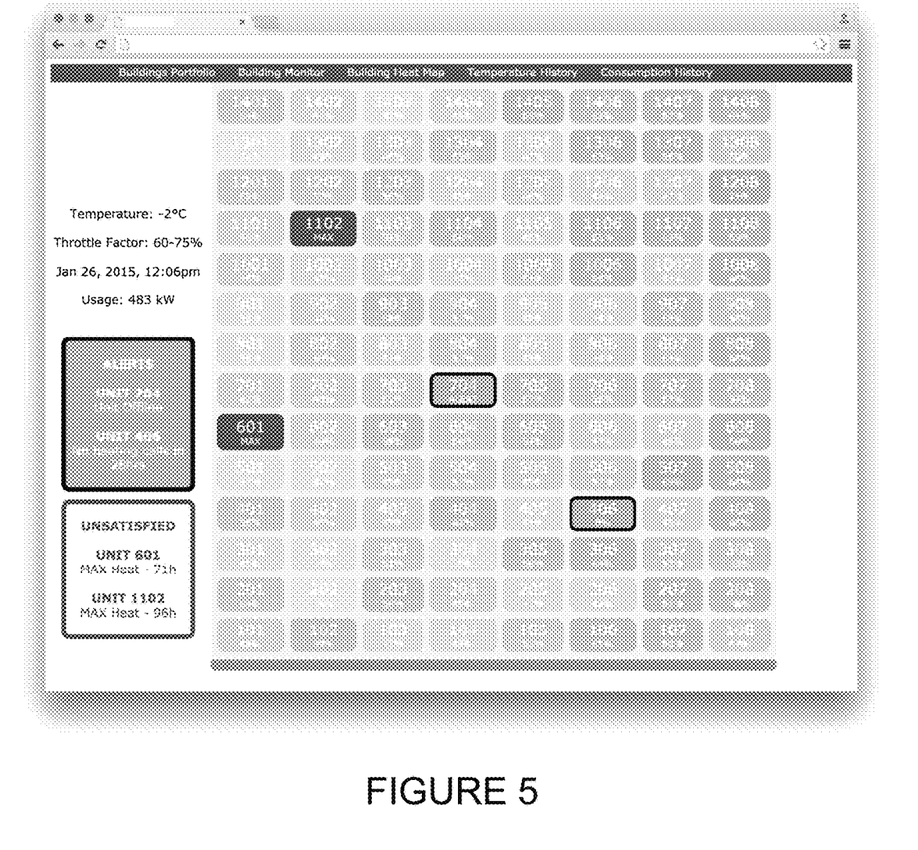
FIG. 5 is a wireframe of a dashboard of the user interface according to a further embodiment of the present invention.

Referring to FIG. 5, a variant to the user interface screen in FIG. 3 is presented. In FIG. 5, instead of presenting the user with the energy consumption of the heating device of the different units, the percentage of time that the heating device is active is provided. As can be seen, most of the heating devices in the various units are within the set parameters. Most of the units are under 100% in terms of how much time the heating devices are active. The percentages provided on the user interface are in terms of the amount of time that the heating device is active for each unit. As an example, if the heating device is active half of the time, then the percentage shown for that associated unit would be 50%. Since there is a set duty cycle for each heating device, if the heating device in a unit is active for the maximum allowable amount of time for the given duty cycle, then the user interface would show that unit has reached its limit. As can be seen from FIG. 5, units 1102 and 601 are listed with MAX instead of a percentage, indicating that the allowed duty cycle for those units have been reached. Similarly, for unit 406, since the heating device for that unit has been inactive, then 0% is shown for that unit on the user interface. For unit 704, since the monitoring module for that unit is offline, then an ALERT indication is associated with that unit.

It should be noted that one or more units listed with MAX instead of a percentage, especially for prolonged periods of time, may require a visit from the building superintendent. The system would limit power to the unit for energy savings but the high energy consumption may indicate a fault in the system or extraneous circumstances occurring in the unit (e.g. tenant is away or tenant is very wasteful).

Figure 6:
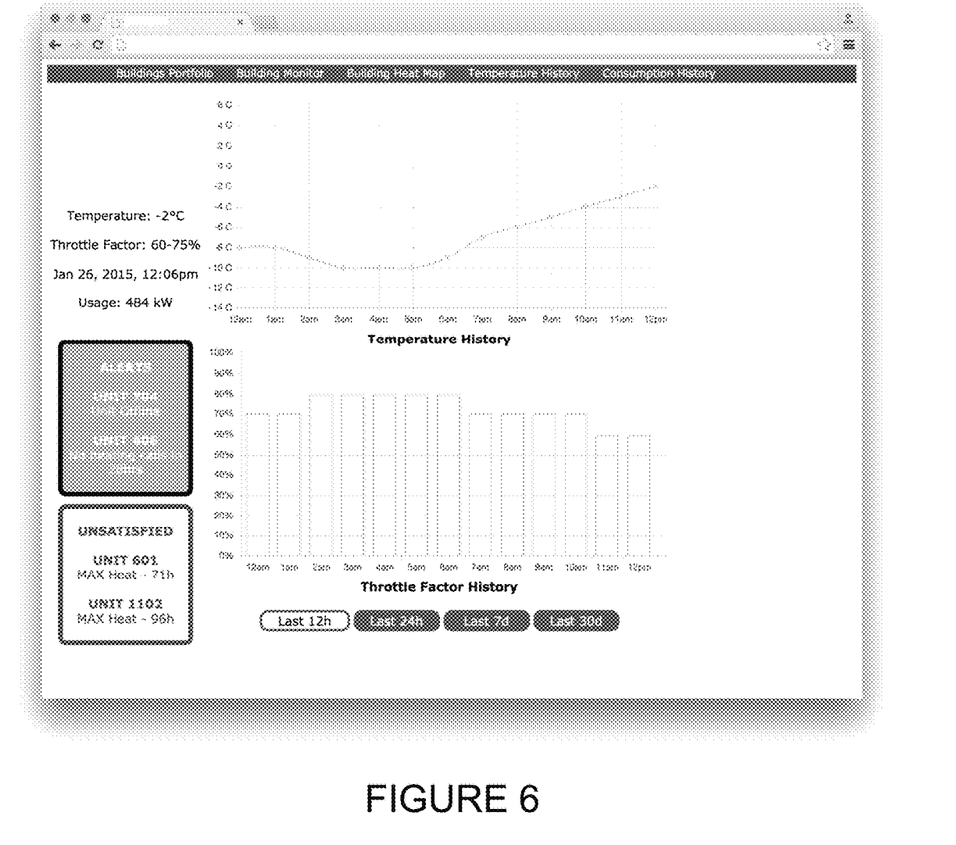
FIG. 6 is a wireframe of the user interface according to another embodiment of the present invention.

Referring now to FIG. 6, another user interface is illustrated. The user interface presented in FIG. 6 presents historical data to the user, including an outside temperature history as well as history for maximum duty cycle settings (i.e. "throttle factor") for one or more specific buildings. As can be seen from FIG. 6, the time window covered by the history on the user interface is user configurable. In the illustrated interface, the user may choose a time window for the last twelve hours, the last twenty four hours, for the last seven days, and for the last thirty days. The time window can be implemented by having the user device retrieve the relevant data from the online data storage. In one implementation, the aggregated data records from the monitoring modules are uploaded to the data storage by the central server using time coded files. By automatically selecting the relevant files, the user device can retrieve the files needed to show the relevant data to the user.

The user interface may also include several tabs for different information screens including a portfolio of all of the buildings under a user's care, a building monitor, a building heatmap, a temperature history, and an energy consumption history.

As noted above, the system may automatically send an alert to a user such as a building manager. The alert may indicate the passing of energy use thresholds of a given unit as shown on the dashboard. In some implementations, the relevant modules may detect a fault condition and report the fault condition to the central server over the network. The server can then validate the message and transmit an alert to the user.

For the user's convenience, the user may enable or disable certain alerts or alert types. The user may also filter the alerts by urgency based on either preset or user set settings. The urgency may be based on the nature of the alert and the alert may be routed to different destinations. As an example, informational alerts indicating that a unit is approaching the maximum allowed energy output or an alert indicating that the outside temperature is rising may be rerouted to storage for later review. This may be an email mailbox specifically tasked for this function. Similarly, an alert that a heating device has failed and that the outside temperature is −25 C may be, instead of being sent to a mailbox, be routed to cause a text message to be sent to the user or to the building supervisor or superintendent. Other alerts which, in the past, may have been nuisance or non-urgent alerts, may be shunted or re-routed to less urgent alert delivery methods. As well, alerts may be combined with Boolean logic to increase the urgency of a specific alert. As an example, an alert detailing the failure of a heating unit and a temperature reading below −10 C may cause the alert's urgency to be elevated to the highest priority. Similarly, the same alert and a temperature reading of 20 C may reduce the alert's urgency to a lower level.

As noted above, in some embodiments of the invention, certain categories of alerts may be sent to different users.

In one embodiment, a tenant of a unit may have access to communicate with the system to provide feedback or requests to the building manager user.

Figure 7:
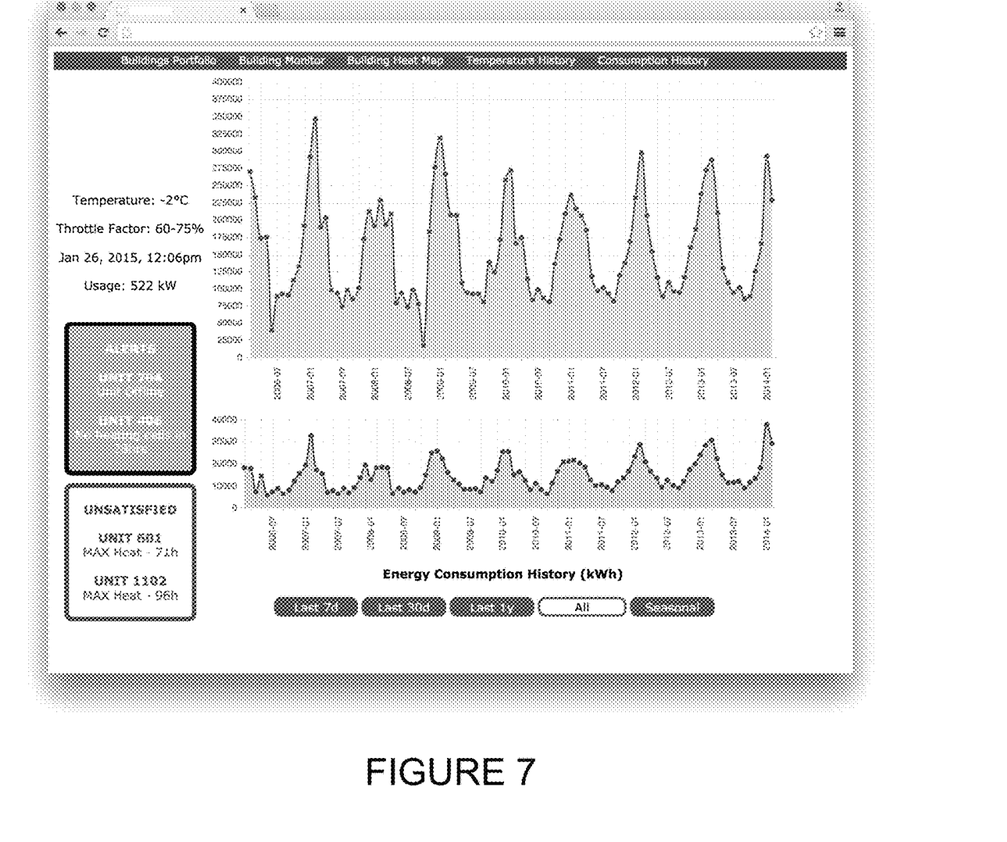
FIG. 7 is a wireframe of the user interface according to yet another embodiment of the present invention.

Referring to FIG. 7, another user interface is illustrated. This user interface shows energy consumption for a given unit or building over a given period of time. The user interface can be used to illustrate the amount of energy saved over time. As can be seen, the time window for the energy consumption of the unit or building can be selected from the past week, the past month, or for the last year. Similarly, a complete history for the unit or building can be viewed by the user. Finally, the user may view the energy consumption history for the unit or building on a seasonal basis.

Regarding the actual node to be used in the system of the invention, this node, which includes the monitoring module as well as the controlling module, may be installed in a new electrical panel. The new panel may be recessed into the wall beside the existing panel. For security purposes, tamper-proof screws may be employed when installing the hardware.

The intelligent nodes in one implementation may be installed in a given unit or in the electrical room of a building. In one embodiment, the intelligent node may include a monitor. The monitor may be an LED monitor and may, for convenience, include touch screen local controls. It should be clear that, in one embodiment, the present invention does not require rewiring or new electrical panels to be installed as the intelligent nodes may be retrofitted into existing devices and technologies.

Regarding communications between the user's device and the central server or main controller device, any commands from the user's device are sent directly to the central server. The central server then interprets these commands and sends out corresponding commands to the relevant controlling modules. As can be imagined, commands from the user's device may be system wide in scope (e.g. set system throttle factor to 75%), be only for a subset of the units under control (e.g. set throttle factor to 60% for units on the north side), or only affect a single unit (e.g. set throttle factor to 80% for unit 1104 or set maximum setting for unit 405).

As noted above, each building may have a central server that controls the various modules in the various units in that building. Depending on the configuration of the system, an even higher level server, controlling the central servers of multiple buildings, may be used with the user communicating with either this server or directly communicating with the various central servers of the multiple buildings.

To ensure the functionality of the various controlling modules in a building, the central server may send out periodic refresh commands to each of the modules. Each module will thus be forced to acknowledge/respond to the controlling module, thereby informing the central server that it is functioning. Of course, if a controlling module does not respond, then the central server may issue an alert that the controlling module may have malfunctioned.

The method steps of the invention may be embodied in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory means such computer diskettes, CD-ROMs, Random Access Memory (RAM), Read Only Memory (ROM), FLASH Memory or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components. Embodiments can be implemented as a computer program product for use with a computer system. Such implementations may include a series of computer instructions fixed either on a tangible medium, such as a computer readable medium (e.g., a diskette, CD-ROM, ROM, FLASH media, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A system for managing energy consumption at each unit at a multi-unit user location, the system comprising:
   a plurality of controller modules, each controller module being for controlling how much energy is used by a specific device in a unit at said multi-unit user location;
   a plurality of monitoring modules, each monitoring module being for monitoring and reporting on said specific device as requested and in real-time over a specific period of time;
   a main controller device at said multi-unit user location, said main controller device being for receiving reports from said plurality of monitoring modules and for controlling each of said plurality of controller modules, said main controller device also being for aggregating reports from said monitoring modules, sending said reports to a central data storage in real-time, and for receiving control commands relating to said controller modules from a user at said multi-unit user location in real-time;
   wherein
   each controller module is independently controlled by said main controller device;
   said main controller device provides said user with control of said plurality of controller modules independent from a remote energy source;
   said main controller device controls an energy consumption for said specific device based on current external conditions consisting of present environmental conditions at said multi-unit user location, said environmental conditions including at least one of external temperature, wind speed, and weather; and
   said main controller device retrieves said external conditions through an Internet-based data feed that provides external data in real-time;
   said main controller device sets a throttle factor for said specific device based on said external conditions, said throttle factor being related to said control commands and said throttle factor limiting said energy consumption for said specific device; and
   further comprising an external sensor for monitoring a current second external condition present at said multi-unit user location, said external sensor being in communication with said main controller device, wherein said main controller device communicates a fail-safe trigger to each of the plurality of controller modules when a threshold discrepancy is met between said external conditions and said second external condition, said fail-safe trigger overriding said throttle factor.

2. A system according to claim 1, wherein said main controller device communicates wirelessly with said monitoring modules and said controller modules.

3. A system according to claim 1, wherein said central data storage is accessible to said main controller device by way of an Internet portal.

4. A system according to claim 1, wherein said user accesses said reports and sends commands to said main controller device by way of the Internet.

5. A system according to claim 1, wherein each controller module controls an activation and inactivation time of said specific device to further control said energy consumption for said specific device.

6. A system according to claim 1, wherein at least one monitoring module is coupled to said specific device to directly measure power being used by said specific device.

7. A system according to claim 1, wherein said specific device is a heating device.

8. A system according to claim 1, wherein said main controller device issues an alert to said user whenever at least one of said plurality of monitoring modules indicates that said energy consumption is not within predetermined acceptable limits.

9. A system according to claim 1, wherein each of said monitoring modules reports on an activation and inactivation of an associated specific device.

10. A system according to claim 1, wherein each of said controller modules controls an associated energy consumption of an associated specific device.

11. A system according to claim 1, wherein said main controller device modifies said energy consumption for said specific device based on a second energy consumption of similar devices at locations experiencing similar conditions to said external conditions.

12. A system according to claim 1, wherein said main controller device modifies said energy consumption for said specific device based on measurable phenomena.

13. A system for managing energy consumption at each unit at a multi-unit user location, the system comprising:
   a plurality of controller modules, each controller module being for controlling how much energy is used by a first unit among a block of units surrounding said first unit at said multi-unit user location;
   a plurality of monitoring modules, each monitoring module being for monitoring and reporting on said first unit as requested and in real-time over a specific period of time;

a main controller device at said multi-unit user location, said main controller device being for receiving reports from said plurality of monitoring modules and for controlling each of said plurality of controller modules, said main controller device also being for aggregating reports from said monitoring modules, sending said reports to a central data storage in real-time, and for receiving control commands relating to said controller modules from a user at said multi-unit user location in real-time;

an external sensor for monitoring a second external condition present at said multi-unit user location, said external sensor being in communication with said main controller device;

wherein each controller module is independently controlled by said main controller device;

said main controller device provides said user with control of said plurality of controller modules independent from a remote energy source;

said main controller device controls an energy consumption for said block of units based on external conditions that includes energy consumption of said first unit;

said main controller device retrieves said external conditions through an Internet-based data feed that provides external data in real-time;

said main controller device sets a throttle factor for said block of units based on said external conditions, said throttle factor being related to said control commands and said throttle factor limiting said energy consumption for said block of units: and said main controller device communicates a fail-safe trigger to each of the plurality of controller modules when a threshold discrepancy is met between said external conditions and said second external condition, said fail-safe trigger overriding said throttle factor.

14. A system according to claim 13, wherein said main controller device communicates wirelessly with said monitoring modules and said controller modules.

15. A system according to claim 13, wherein said central data storage is accessible to said main controller device by way of an Internet portal.

16. A system according to claim 13, wherein said user accesses said reports and sends commands to said main controller device by way of the Internet.

17. A system according to claim 13, wherein said main controller device issues an alert to said user whenever at least one of said plurality of monitoring modules indicates that said energy consumption is not within predetermined acceptable limits.

18. A system according to claim 13, wherein said external conditions further include at least one of external temperature, wind speed, weather, and measurable phenomena.

* * * * *